United States Patent [19]

Haas, Jr.

[11] Patent Number: 5,000,640

[45] Date of Patent: Mar. 19, 1991

[54] SPLIT NUT

[76] Inventor: Edward T. Haas, Jr., 6882 Trigo Rd., Goleta, Calif. 93117

[21] Appl. No.: 174,500

[22] Filed: Mar. 28, 1988

[51] Int. Cl.$^5$ .............................................. F16B 37/08
[52] U.S. Cl. .................................. 411/432; 411/437; 411/409; 411/907
[58] Field of Search ............... 411/402, 408, 409, 432, 411/433, 434, 436, 437, 907, 908; 74/450; 415/92

[56]  References Cited

U.S. PATENT DOCUMENTS

| 30,898 | 5/1899 | Paine | 68/4 |
|---|---|---|---|
| 262,319 | 8/1882 | Gärtner | 292/288 |
| 1,082,993 | 12/1913 | Beattie | 411/433 |
| 1,329,126 | 1/1920 | Leming | 411/433 X |
| 1,366,884 | 1/1921 | Nahrung | 411/432 |
| 1,652,169 | 12/1927 | Flaming | 411/433 |
| 1,915,588 | 6/1933 | Arrington | 411/433 |
| 1,925,948 | 9/1933 | Been | 74/424.8 R |
| 2,399,090 | 4/1946 | Ballak | 10/86 W |
| 2,676,509 | 4/1954 | Graham | 411/433 |
| 3,270,417 | 9/1966 | Stram | 415/92 |
| 4,274,323 | 6/1981 | Resnicow | 411/433 |
| 4,432,684 | 2/1984 | Palmer et al. | 411/437 X |

FOREIGN PATENT DOCUMENTS

| 8805266 | 6/1953 | Fed. Rep. of Germany | 411/433 |
|---|---|---|---|
| 455165 | 10/1936 | United Kingdom | 411/432 |

Primary Examiner—Gary L. Smith
Assistant Examiner—Suzanne L. Dino
Attorney, Agent, or Firm—Harry W. Brelsford

[57] ABSTRACT

A split nut is made of elastic material that deflects under manual pressure. Each nut half has a projecting bead and a keyhole recess. The beads removably fit into the keyhole recesses to hold the nut halves together. Radial fins permit rotation by air jet and enlarge the size of the nut halves to make manual disassembly easier.

2 Claims, 1 Drawing Sheet

SPLIT NUT

This invention relates to a split nut that is internally threaded to be rotated on a threaded shaft to change the position of the nut on the shaft.

Split nuts can be snapped onto a threaded shaft without the necessity of threading the nut onto the shaft from one end of the shaft. Also a split nut can be removed from a shaft by snapping it off of the shaft without the necessity of threading it off of one end of the shaft.

Split nuts are useful on long threaded shafts such as the screws on lathes, drill press limit shafts and all manner of other machines using threaded shafts. The nuts can be used as limit stops, indicators or alarm operators when limit is reached.

BRIEF SUMMARY OF THE INVENTION

The split nut of the invention includes a pair of beads aligned with the threading axis and a pair of elongated keyhole recesses aligned with the threading axis. The beads fit into the recesses to hold the nut halves together. The beads may be on one nut half and the recesses on the other or they may be mixed. The part of the nuts having the recesses are preferably of flexible but elastic material such as plastic s that the beads may be pressed into the keyhole recesses. Alternatively, both keyholes and beads may be of flexible but elastic material or the beads alone can be of flexible but elastic material.

The split nut of this invention may also have radial fins that make possible the rotation of the nut on a shaft by the use of an air jet such as a nozzle from a compressed air source. The fins also act as convenient handles for pulling the two nut halves apart.

BRIEF DESCRIPTION OF THE DRAWINGS

Various objects, features and advantages of the invention will be apparent in the following description and claims considered together with the drawings forming an integral part of this application in which:

DETAILED DESCRIPTION

Figure 1:
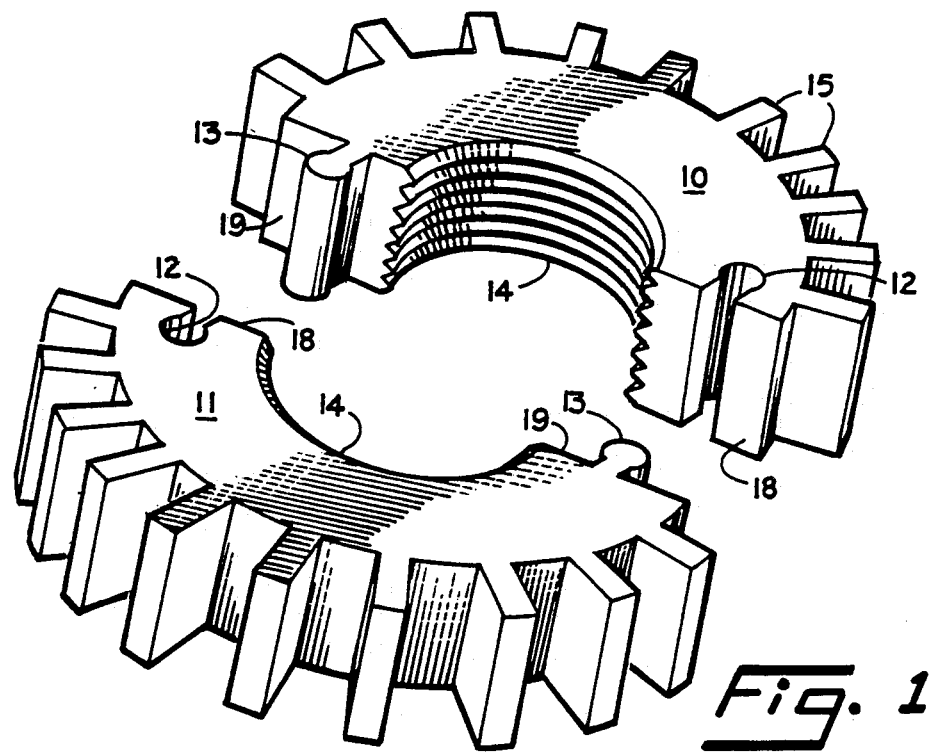
FIG. 1 is a three dimensional exploded view of the presently preferred embodiment of a nut incorporating the invention.

Referring to FIG. 1, two nut halves, 10 and 11, each have a keyhole recess 12 and a projecting head 13. Each half, 10 and 11, is made of elastic material that is manually deflectable so that a human hand can squeeze the two halves together causing the beads to penetrate the keyhole recesses. Each half, 10 and 11, has internal threads 14. Each half has a plurality of external fins 15 radially projecting from the periphery of the nut assembly, which permits rotation of the assembled nut by a jet of compressed air or other fluid. The fins 15, also help in manually gripping the nut halves to pull them apart.

While the keyhole recesses 12 could be on one half and the projecting beads 13 on the other, I prefer the arrangement shown in that one piece can be manufactured to form both halves, thus saving on dies or other manufacturing costs.

Figure 2:
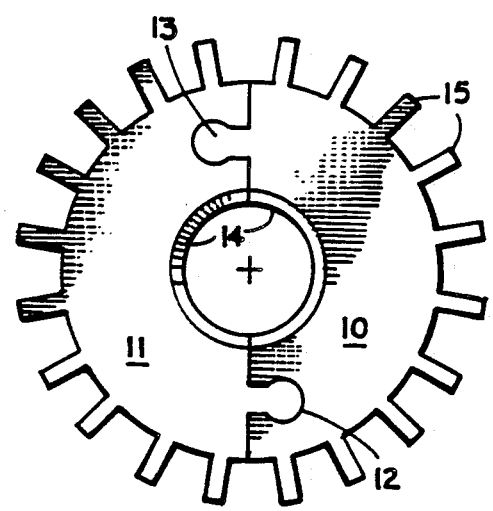
FIG. 2 is a plan view of the nut of FIG. 1 in its assembled state.
Figure 3:
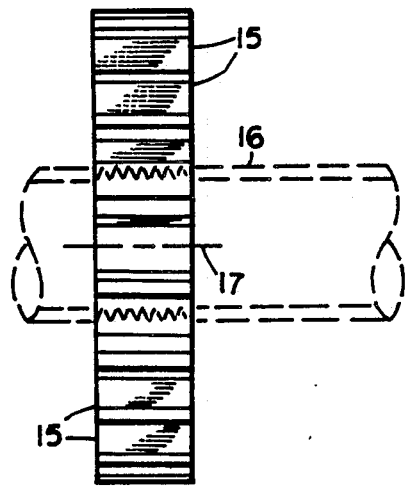
FIG. 3 is an elevation view of one half of the split nut of FIG. 1.

Referring to FIGS. 2 and 3, there is shown in broken outline a threaded shaft 16 having a shaft axis 17. The nut halves 10 and 11 are merely fitted over such a threaded shaft.

Referring to FIG. 1, each nut half has two faces 18 and 19 and the keyhole recesses 12 are formed in face 18 and the beads 13 project from the face 19. There it will be noted that the fasteners 12 and 13 are out of contact with the threads 14.

I presently prefer to have the faces 18 and 19, the elongated beads 13 and the keyhole recesses 14 parallel to the shaft axis 17 for ease of manufacture but it will be appreciated that these could all be at an angle to axis 17 and still be effective fasteners. When the two nut halves are assembled, I presently prefer to have the faces 18 and 19 in contact.

Referring to the fins 15, I have reduced the number to two on each half and applied a jet of air to the fins when the split nut is threaded on a shaft. The split nut rotates with two fins but not with one on each split half. Three fins on each half results in satisfactory rotation by air jet. I prefer, however, to have more than three on each half to give rotation under all circumstances. The use of a large number of spaced fins from 5 to 10 or more each half as needed to indicate position on the shaft as well as turning by air blast is desirable and also results in easy manual gripping of the two halves to pull the two halves apart to remove the assembled nut from a threaded shaft.

Various elastic materials can be used for the beads 13 and recesses 12 and if both beads are on the one half and both keyholes on the other, then only one half need be elastic. While many materials are elastic including steel, I prefer materials that deflect under manual pressure. Various plastic and rubber formulations are satisfactory and I presently prefer polyethylene and polypropylene.

I have described the presently preferred embodiment of my invention as required by the patent statutes. It will be apparent to those skilled in the industry that variations and modifications can be made and I include all such variations and modifications within the scope of the following claims, that fall within the true spirit and scope of the invention.

I claim:

1. A split nut for snapping onto and off of a cylindrical threaded shaft having a shaft axis comprising:
   (a) a pair of nut halves that are internally threaded with threads that match those of the threaded shaft and each half having a pair of mating surfaces in contact with each other when the nut is assembled on the shaft;
   (b) a pair of elongated beads projecting from two of said mating surfaces having an elongation parallel to the respective mating surface;
   (c) a pair of elongated keyhole recesses formed in the other two of the mating surfaces and elongated parallel to the elongation of the bead to be received in recess; at least one pair of said projecting beads and the material surrounding the keyhold recesses being formed of elastic material so that the two nut halves can be manually pressed together and manually pulled apart to attached to and remove the nut from the shaft, and wherein the assembled nut is freely rotatable on the shaft; and
   (d) more than two spaced radial fins on each nut half, to permit rotation of the assembled nut by fluid jet impinging on the fins.

2. A split nut for snapping onto and off of a cylindrical threaded shaft comprising:
   (a) a pair of nut halves that are internally threaded with threads that match the shaft threads and each half having mating surfaces that are adjacent to each other when the halves are assembled on the shaft;
   (b) a pair of beads projecting from two of said mating surfaces;
   (c) a pair of keyhold recesses formed on the other two mating surfaces, at least one pair of said projecting beads and the material surrounding the pair of recesses being formed of elastic material so that the two nut halves can be manually pressed together to encircle the shaft and cause the beads to penetrate the keyhole recesses and manually pulled apart to remove the nut from the shaft, and wherein the assembled nut is freely rotatable on the shaft; and
   (d) more than two spaced radial fins on each nut half, to permit rotation of the assembled nut by fluid jet impinging on the fins.

* * * * *